United States Patent
Van Hook et al.

(10) Patent No.: US 8,074,058 B2
(45) Date of Patent: Dec. 6, 2011

(54) PROVIDING EXTENDED PRECISION IN SIMD VECTOR ARITHMETIC OPERATIONS

(75) Inventors: Timothy J. Van Hook, Atherton, CA (US); Peter Hsu, San Francisco, CA (US); William A. Huffman, Los Gatos, CA (US); Henry P. Moreton, Woodside, CA (US); Earl A. Killian, Los Altos Hills, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 136 days.

(21) Appl. No.: 12/480,414

(22) Filed: Jun. 8, 2009
(Under 37 CFR 1.47)

(65) Prior Publication Data
US 2009/0249039 A1   Oct. 1, 2009

Related U.S. Application Data

(63) Continuation of application No. 11/337,440, filed on Jan. 24, 2006, now Pat. No. 7,546,443, which is a continuation of application No. 09/223,046, filed on Dec. 30, 1998, now Pat. No. 7,159,100, which is a continuation of application No. 08/947,648, filed on Oct. 9, 1997, now Pat. No. 5,864,703.

(51) Int. Cl.
*G06F 15/00* (2006.01)
(52) U.S. Cl. ........... 712/222; 712/221; 712/22; 708/490
(58) Field of Classification Search .................. 712/222, 712/221, 22; 708/490
See application file for complete search history.

(56) References Cited

U.S. PATENT DOCUMENTS

| | | | |
|---|---|---|---|
| 3,654,621 A | 4/1972 | Bock et al. | |
| 3,916,388 A | 10/1975 | Shimp et al. | |
| 4,023,023 A | 5/1977 | Bourrez et al. | |
| 4,109,310 A | 8/1978 | England et al. | |

(Continued)

FOREIGN PATENT DOCUMENTS

EP   0 681 236 A1   11/1995

(Continued)

OTHER PUBLICATIONS

Halfhill, Tom R. and Belgard, Rich., "Mips vs. Lexra: Definitely Not Aligned," *Microprocessor Report*, vol. 13, No. 16, Dec. 6, 1999, pp. 14-19.

(Continued)

*Primary Examiner* — Larry Donaghue
(74) *Attorney, Agent, or Firm* — Sterne, Kessler, Goldstein & Fox P.L.L.C.

(57) ABSTRACT

The present invention provides extended precision in SIMD arithmetic operations in a processor having a register file and an accumulator. A first set of data elements and a second set of data elements are loaded into first and second vector registers, respectively. Each data element comprises N bits. Next, an arithmetic instruction is fetched from memory. The arithmetic instruction is decoded. Then, the first vector register and the second vector register are read from the register file. The present invention executes the arithmetic instruction on corresponding data elements in the first and second vector registers. The resulting element of the execution is then written into the accumulator. Then, the resulting element is transformed into an N-bit width element and written into a third register for further operation or storage in memory. The transformation of the resulting element can include, for example, rounding, clamping, and/or shifting the element.

20 Claims, 8 Drawing Sheets

U.S. PATENT DOCUMENTS

| | | |
|---|---|---|
| 4,128,880 A | 12/1978 | Cray, Jr. |
| 4,130,880 A | 12/1978 | Nutter |
| 4,219,874 A | 8/1980 | Gusev et al. |
| 4,317,170 A | 2/1982 | Wada et al. |
| 4,396,982 A | 8/1983 | Wada et al. |
| 4,491,910 A | 1/1985 | Caudel et al. |
| 4,507,731 A | 3/1985 | Morrison |
| 4,511,990 A | 4/1985 | Hagiwara et al. |
| 4,520,439 A | 5/1985 | Liepa |
| 4,583,199 A | 4/1986 | Boothroyd et al. |
| 4,773,006 A | 9/1988 | Kinoshita et al. |
| 4,809,212 A | 2/1989 | New et al. |
| 4,814,976 A | 3/1989 | Hansen et al. |
| 4,879,676 A | 11/1989 | Hansen |
| 4,928,223 A | 5/1990 | Dao et al. |
| 5,150,290 A | 9/1992 | Hunt |
| 5,185,713 A | 2/1993 | Kobunaya |
| 5,392,228 A | 2/1995 | Burgess et al. |
| 5,418,915 A | 5/1995 | Matuda et al. |
| 5,499,299 A | 3/1996 | Takenaka et al. |
| 5,513,366 A | 4/1996 | Agarwal et al. |
| 5,517,438 A | 5/1996 | Dao-Trong et al. |
| 5,537,562 A | 7/1996 | Gallup et al. |
| 5,550,768 A | 8/1996 | Ogilvie et al. |
| 5,581,773 A | 12/1996 | Glover |
| 5,590,345 A | 12/1996 | Barker et al. |
| 5,594,679 A * | 1/1997 | Iwata .......................... 708/521 |
| 5,666,298 A | 9/1997 | Peleg et al. |
| 5,669,010 A | 9/1997 | Duluk, Jr. |
| 5,671,401 A | 9/1997 | Harrell |
| 5,721,892 A | 2/1998 | Peleg et al. |
| 5,726,927 A | 3/1998 | Wolrich et al. |
| 5,729,724 A | 3/1998 | Sharangpani et al. |
| 5,734,874 A | 3/1998 | Van Hook et al. |
| 5,740,340 A | 4/1998 | Purcell et al. |
| 5,748,979 A | 5/1998 | Trimberger |
| 5,752,071 A | 5/1998 | Tubbs et al. |
| 5,758,176 A | 5/1998 | Agarwal et al. |
| 5,761,523 A | 6/1998 | Wilkinson et al. |
| 5,774,709 A | 6/1998 | Worrell |
| 5,778,241 A | 7/1998 | Bindloss et al. |
| 5,784,602 A | 7/1998 | Glass et al. |
| 5,790,827 A | 8/1998 | Leung |
| 5,793,661 A | 8/1998 | Dulong et al. |
| 5,801,975 A * | 9/1998 | Thayer et al. ................ 708/402 |
| 5,809,294 A | 9/1998 | Ando |
| 5,812,147 A | 9/1998 | van Hook et al. |
| 5,812,723 A | 9/1998 | Ohtsu et al. |
| 5,815,695 A | 9/1998 | James et al. |
| 5,815,723 A | 9/1998 | Wilkinson et al. |
| 5,822,606 A | 10/1998 | Morton |
| 5,838,984 A | 11/1998 | Nguyen et al. |
| 5,848,269 A | 12/1998 | Hara |
| 5,852,726 A | 12/1998 | Lin et al. |
| 5,864,703 A | 1/1999 | van Hook et al. |
| 5,867,682 A | 2/1999 | Witt et al. |
| 5,880,984 A | 3/1999 | Burchfiel et al. |
| 5,881,307 A * | 3/1999 | Park et al. .................... 712/23 |
| 5,887,183 A * | 3/1999 | Agarwal et al. ............... 712/2 |
| 5,892,965 A * | 4/1999 | Miura et al. .................. 712/34 |
| 5,909,565 A * | 6/1999 | Morikawa et al. ............ 712/200 |
| 5,922,066 A | 7/1999 | Cho et al. |
| 5,933,650 A | 8/1999 | van Hook et al. |
| 5,936,872 A | 8/1999 | Fischer et al. |
| 5,953,241 A | 9/1999 | Hansen et al. |
| 5,960,012 A | 9/1999 | Spracklen |
| 5,963,461 A * | 10/1999 | Gorshtein et al. ............ 708/503 |
| 5,987,597 A * | 11/1999 | Miura et al. .................. 712/222 |
| 5,996,056 A | 11/1999 | Volkonsky |
| 6,006,316 A | 12/1999 | Dinkjian |
| 6,035,316 A | 3/2000 | Peleg et al. |
| 6,035,317 A | 3/2000 | Guy |
| 6,058,465 A | 5/2000 | Nguyen |
| 6,065,115 A | 5/2000 | Sharangpani et al. |
| 6,067,615 A | 5/2000 | Upton |
| 6,078,941 A | 6/2000 | Jiang et al. |
| 6,088,783 A | 7/2000 | Morton |
| 6,128,726 A | 10/2000 | LeComec |
| 6,141,421 A | 10/2000 | Takaragi et al. |
| 6,154,834 A | 11/2000 | Neal et al. |
| 6,233,597 B1 | 5/2001 | Tanoue et al. |
| 6,266,758 B1 | 7/2001 | van Hook et al. |
| 6,349,318 B1 | 2/2002 | Vanstone et al. |
| 6,401,194 B1 * | 6/2002 | Nguyen et al. ................ 712/210 |
| 7,159,100 B2 | 1/2007 | van Hook et al. |
| 7,822,968 B2 * | 10/2010 | Vorbach et al. ............... 713/100 |
| 2006/0129787 A1 | 6/2006 | van Hook et al. |

FOREIGN PATENT DOCUMENTS

| | | |
|---|---|---|
| EP | 0 681 236 B1 | 11/2000 |
| WO | WO 97/07450 | 2/1997 |
| WO | WO 97/08608 | 3/1997 |

OTHER PUBLICATIONS

Hansen, Craig, "Architecture of a Broadband Mediaprocessor," *COMPCON96*, Feb. 25-29, 1996, 8 pages.

Yarlagadda, Krishna, "Lexra Adds DSP Extensions," *Microprocessor Report*, Aug. 23, 1999, pp. 19-21.

*Lexra Command Line User Environment(CLUE) for ASYM-LX User's Guide*, Revision 1.1, Jan. 28, 2000, pp. 1-32.

*LX4280* (Copyright 1998-1999) <http://www.lexra.com/l.times.4280.html>, 2 pages.

*LX5280* (Copyright 1998-1999) <http://www.lexra.com/l.times.5280.html>, 2 pages.

*LX4080P* (Copyright 1998-1999) <http://www.lexra.com/l.times.4080p.html>, 6 pages.

*LX4080* (Copyright 1998-1999) <http://www.lexra.com/l.times.4080.html>, 8 pages.

*LX4180* (Copyright 1998-1999) <http://www.lexra.com/l.times.4180.html>, 9 pages.

*Lexra [Products]* (Copyright 1998-1999) <http://www.lexra.com/1.times.products2.html>, 2 pages.

"Lexra Rolls Out Second MIPS Core. (Lexra LX4180) (Product Announcement)," *Microprocessor Report*, Jan. 28, 1999, 2 pp. (printed from West database).

"LX4280 Fills Lexra's Midrange. (MIPS-compatible embedded processor core) (Product Announcement)," *Microprocessor Report*, Aug. 2, 1999, 2 pages (printed from West database).

*Lexra Announces LX4080 Embedded RISC Processor Core. Delivering High Performance & Executes MIPS-I instructions set*\* (Jan. 12, 1998) <http://www.lexra.com/pr 980112.html>, 2 pages.

*Lexra Announces LX4080 SmoothCore™ Silicon Proven RISC Core* (Mar. 23, 1998) <http://www.lexra.com/pr 980323.html>, 3 pages.

*Lexra Announces its LX4080 Evaluation System is Proven and Available for Production* (Jul. 20, 1998) <http://www.lexra.com/pr 980720.html>, 2 pages.

*Lexra Announces the First Mainstream 32-bit RISC Core In a Programmable Logic Device* (Oct. 5, 1998) <http://www.lexra.com/pr 981005.html/>, 2 pages.

*Lexra Announces Next Generation Embedded RISC Core* (Jan. 11, 1999) <http://www.lexra.com/pr 990111.html>, 3 pages.

*Lexra Announces Industry's First RISC-DSP Core Based on MIPS® Instruction Set Architecture* (May 5, 1999) <http://www.lexra.com/pr 990505.html>, 3 pages.

*Lexra Announces the Fastest 32-BIT RISC Core to Execute MIPS® Instructions*\* (Jul. 19, 1999) <http://www.lexra.com/pr 990719.html>, 2 pages.

*MIPS Technologies, Inc. Files Lawsuit to Protect Intellectual Property Rights* (Oct. 28, 1999) <http://www.mips.com/pressReleases/102899B.html>, 2 pages.

*MIPS: Open Letter from John Bourgoin, CEO, MIPS Technologies* (visited Feb. 24, 2000) http://www.mips.com/pressReleases/102899C.html>, 2 pages.

*MIPS Technologies, Inc. Litigation Overview and Q&A* (visited Feb. 24, 2000) <http://www.mips.com/pressReleases/102899D.html>, 3 pages.

*Lexra ASYM-LX Simulator/FIR Filter Demo*, date unknown, 5 pages.

*Lexra ASYM-LX Instruction Set Simulator Product Brief*, date unknown, 2 pages.

Hays, Pat, LX5280 High-Performance RISC-DCP for IP Licensing (Jun. 8, 1999) <http://www.lexra.com/presentation/>, 27 pages.

*Lexra LX5280 Seminar Slides*, Date unknown, 49 pages.

88410 Second Level Cache, *Microprocessor Forum*, Nov. 1991, 20 pages.

Eyre, Jennifer and Bier, Jeff, "Infineon's TriCore Tackles DSP," *Microprocessor Report*, Apr. 19, 1999, pp. 12-14.

Case, Brian, "Superscalar Techniques: SuperSPARC vs. 88110," *Microprocessor Report*, vol. 5, No. 22, Dec. 4, 1991, pp. 1 and 6-11.

Feigel, Curtis P., "TI Introduces Four-Processor DSP Chip," *Microprocessor Report*, Mar. 28, 1994, pp. 22-25.

Bier, Jeff, "DSP16xxx Targets Communications Apps," *Microprocessor Report*, Sep. 15, 1997, pp. 11-15.

Turley, Jim and Hakkarainen, Harri, "TI's New C6x DSP Screams at 1,600 MIPS," *Microprocessor Report*, Feb. 17, 1997, pp. 14-17.

*i860™ Microprocessor Family Programmer's Reference Manual*, Intel Corporation, 1992, 79 pages, (Bates Nos. L09361-L09439).

Lee, Ruby, "Accelerating Multimedia with Enhanced Microprocessors," *IEEE Micro*, IEEE, Apr. 1995, pp. 22-32, (Bates Nos. L08566-L08576).

*DSP56000 24-Bit Digital Signal Processor Family Manual*, Motorola, Inc., 1995, 638 pages (Bates Nos. L08722-L09359).

Peleg, A. and Weiser, U., "MMX Technology Extension To The Intel Architecture," *IEEE Micro*, IEEE, Aug. 1996, pp. 42-50 (Bates Nos. L07222-L07230).

El-Sharkawy, Mohamed, Ph.D., *Digital Signal Processing Applications with Motorola's DSP56002 Processor*, Prentice Hall PTR, 1996, pp. 43-124 (Bates Nos. L06519-L06601).

*DSP56002 Processor 24-Bit Digital Signal Processor User's Manual*, Motorola, Inc., 1995, 386 pages (Bates Nos. L07277-L07662).

*DSP56002 Semiconductor Technical Data*, Motorola, Inc., 1996, 110 pages (Bates Nos. L07803-L07912).

*DSP65002/DSP56L002 Motorola Semiconductor Product Information*, Motorola, Inc., 1994, 3 pages. (Bates Nos. L07913-L07915).

*TMS320C1x/C2x/C2xx/C5x Assembly Language Tools User's Guide*, Texas Instruments, Mar. 1995, 483 pages (Bates Nos. L07916-L08398).

*TMS320C5x General-Purpose Applications User's Guide*, Texas Instruments, Jun. 1997, 167 pages (Bates Nos. L08399-L08565).

Diefendorff, K., "The 88110: A Superscalar Microprocessor with Graphics Support (Motorola)," *Microprocessor Forum*, Nov. 1991, 20 pages (Bates Nos. L00622-00641).

Diefendorff, K. And Allen, M., *Organization of the Motorola 88110: A Superscalar RISC Microprocessor*, Motorola Inc., date unknown, 12 pages (Bates Nos. L00642-00653).

*MIPS Technologies' Proposed Claim Construction Statement Pursuant to Local Rule 16-10(A) with Exhibits A and B*, 15 Pages, Filed Apr. 17, 2000 in *MIPS Technologies, Inc. v. Lexra, Inc.*, United States District Court for the Northern District of California-Oakland Division, Case No. C99-04766 SBA.

*An Introduction to Thumb™*, Version 2.0, Advanced RISC Machines, 29 pages (Mar. 1995).

Gwennap, L., "Digital, MIPS Add Multimedia Extensions," *Microprocessor Report*, MicroDesign Resources, vol. 10, No. 15, pp. 1-5 (Nov. 18, 1996).

Gwennap, L., "New Multimedia Chips to Enter the Fray," *Microprocessor Report*, MicroDesign Resources, vol. 10, No. 13, 1 page (Oct. 1996).

*QML-DSP/MCM and Die Courier*, at http://www.ti.com/sc/docs/military/liter/ecour/dsp.htp, 7 pages (Jan. 1996).

*A236 Parallel Digital Signal Processor Chip Programmer's Reference Manual*, Oxford Micro Devices, Inc., 195 pages. (1994) (Bates Nos. L11184-L11378).

*Piccolo—The ARM Signal Processing Architecture*, at http://www.calab.cs.pusan.ac.kr/TechnicalReport . . . , 12 pages (last visited Mar. 6, 2001).

*Microprocessor Devices Reliability Monitor Report: Third Quarter 1997*, Motorola, 8 pages (1997).

*Reliability Monitor Environmental Stress Data 3Q97*, Motorola, 4 pages (1997).

*Reliability and Quality Report 3Q97*, Motorola, 2 pages (1997).

*Microprocessor Devices Reliability Monitor Report: Fourth Quarter 1997*, Motorola, 10 pages (1997).

*Reliability and Quality Report 4Q97*, Motorola, 2 pages (1997).

"Hardware Implications of *xmem* as a *st* followed by a *Id*," *Motorola Semiconductor Engineering Bulletin*, Motorola, 5 pages. (Sep. 1992).

*601 First Silicon*, at http://www.mot.com/SPS/PowerPC/library/press_releases/601_First_Silicon.html, 2 Pages. (Oct. 1, 1992).

"Running the MC88110 in Lockstep," *Motorola Semiconductor Engineering Bulletin*, Motorola, 2 pages. (1992).

*MC88410UM/AD: MC88410 Secondary Cache Controller User's Manual*, at http://www.mot-sps.com/lit/html/mc88410umad.html, 1 page (Jan. 24, 1997).

*AN1214: MC88110 64-bit External Bus Interface to 16-bit EPROM*, at http://www.mot-sps.com/lit/html/an1214.html, 1 page (Jan. 24, 1997).

*TMS320C80 Digital Signal Processor*, Texas Instruments, p. 41 (Jul. 1994).

*EB162: Programming Tips (MC88110)*, at http://www.mot-sps.com/lit/html/eb162.html, 1 page (Jan. 24, 1997).

*MC88110/410DH/AD: MC88110/MC88410 Designer's Handbook*, at http://www.mot-sps.com/lit/html/mc881104l0dhad.html, 1 page (Jan. 24, 1997).

*MC88110UMAD: MC88110 Second Generation RISC Microprocessor User's Manual*, at http://www.rnot-sps.com/lit/html/mc88110umad.html, 1 page (Jan. 24, 1997).

Weiss, R., *ARM Piccolo Mixes ARM RISC with DSP*, at http://ww.estd.com/Editoria1/1996/11/Briefs/arm.html, 1 page (Nov. 1996).

"Interrupt Latency in the MC88110," *Motorola Semiconductor Engineering Bulletin*, Motorola, pp. 1, 2 and 4-9 (1992).

*MIPS Technologies' Opposition to Lexra, Inc.'s Motion For Summary Judgement Of Invalidity Or Noninfringement of U.S. Patent No. 5,864,703 and of Invalidity of U.S. Patent No. 4,814,976*, 26 Pages Filed Feb. 20, 2001 in *MIPS Technologies, Inc. v. Lexra, Inc.*, United States District Court for the Northern District of California—Oakland Division, Case No. C99-04766 SBA.

*Declaration of David A. Nelson in Support of MIPS Technologies' Brief in Opposition to Lexra, Inc.'s Motion for Summary Judgement of Invalidity or Noninfringement of U.S. Patent No. 5,864,703 and of Invalidity of U.S. Patent No. 4,814,976*, 4 Pages, Filed Feb. 20, 2001 in *MIPS Technologies, Inc. v. Lexra, Inc.*, United States District Court for the Northern District of California—Oakland Division, Case No. C99-04766 SBA.

*Declaration of Steven L. Scott*, 4 Pages Dated Sep. 20, 2000, Filed in *MIPS Technologies, Inc. v. Lexra, Inc.*, United States District Court for the Northern District of California—Oakland Division, Case No. C99-04766 SBA.

*Plaintiff MIPS Technologies' Opening Brief in Support of Its Position Regarding Claim Construction*, 21 Pages, Filed Aug. 17, 2000 in *MIPS Technologies, Inc. v. Lexra, Inc.*, United States District Court for the Northern District of California—Oakland Division, Case No. C99-04766 SBA.

*Condensed Transcript of Claims Construction Hearing*, 52 Pages, Dated Apr. 25, 2001, for *MIPS Technologies, Inc. v. Lexra, Inc.*, United States District Court for the Northern District of California—Oakland Division, Case No. C99-04766 SBA.

*Plaintiff MIPS Technologies' Reply Brief in Support of Its Position Regarding Claim Construction*, 19 Pages, Filed Nov. 6, 2000 in *MIPS Technologies, Inc. v. Lexra, Inc.*, United States District Court for the Northern District of California—Oakland Division, Case No. C99-04766 SBA.

*MIPS Technologies' Claim Charts Pursuant to Local Rule 16-9(A)*, 14 Pages, Dated Apr. 17, 2000, Filed in *MIPS Technologies, Inc. v. Lexra, Inc.*, United States District Court for the Northern District of California—Oakland Division, Case No. C99-04766 SBA.

*Order on Claim Construction*, 2 Pages, Dated Sep. 11, 2001, Filed in *MIPS Technologies, Inc. v. Lexra, Inc.*, United States District Court for the Northern District of California—Oakland Division, Case No. C99-04766 SBA.

Bier, J., "DSP16xxx Targets Communications Apps," *Microprocessor Report*, MicroDesign Resources, Sep. 15, 1997, pp. 11-15.

Gwennap, L., "UltraSparc Adds Multimedia Instructions," *Microprocessor Report*, MicroDesign Resources, vol. 8, No. 16, Dec. 5, 1994, pp. 1-3.

Gwennap, L., "Intel's MMX Speeds Multimedia," *Microprocessor Report*, MicroDesign Resources, vol. 10, No. 3, Mar. 5, 1996, pp. 1-6.

Heinrich, J., *MIPS R4000 Microprocessor User's Manual*, Second Edition, MIPS Technologies, Inc., 1994, pp. 154-155, 157, 159, 161, 168, 170-171, B-9-10, B-13, B17, B-19, B-21, B-23, B-27, B-38, B-40, and B-62.

*IEEE Standard for Binary Floating-Point Arithmetic*, IEEE, 1985, pp. 1-14.

Killian, E., "MIPS Extensions for Digital Media," Microprocessor Forum, Oct. 22-23, 1996, pp. 1-5.

"88410 Second Level Cache," *Microprocessor Forum*, Motorola Inc., Nov. 1991, pp. L 00622-L 00641.

*TMS32010 User's Guide*, Texas Instruments Incorporated, 1983, p. 1183.

Turley, J., "Siemens TriCore Revives CISC Techniques," *Microprocessor Report*, MicroDesign Resources, Nov. 17, 1997, pp. 13-16.

*VIS™ Instruction Set User's Manual*, Sun Microsystems, Inc., 1997, pp. 1-136, http:/www.nondot.org/sabre/os/files/processors/VISInstructionSetUsersManual.pdf.

*Plaintiff MIPS Technologies' Objections and Responses to First Set of Interrogatories of Defendant Lexra, Inc.*, 38 pages with Exhibits A-C, Filed Feb. 28, 2000 in *MIPS Technologies, Inc. v. Lexra, Inc.*, United States District Court for the Northern District of California—Oakland Division, Case No. C99-04766 SBA.

IBM Technical Disclosure Bulletin, *Pipelined Hardware Multiplier with Extended Precision*, vol. 23, Issue No. 9, pp. 4322-4323, Feb. 1981 (5 pages submitted).

\* cited by examiner

PROVIDING EXTENDED PRECISION IN SIMD VECTOR ARITHMETIC OPERATIONS

CROSS-REFERENCE TO RELATED APPLICATIONS

This application is a continuation of U.S. application Ser. No. 11/337,440, filed Jan. 24, 2006, now allowed, which is a continuation of U.S. application Ser. No. 09/223,046, filed Dec. 30, 1998, now U.S. Pat. No. 7,159,100, which is a continuation of U.S. application Ser. No. 08/947,648, filed Oct. 9, 1997, now U.S. Pat. No. 5,864,703, each of which is hereby incorporated in its entirety by reference.

FIELD OF THE INVENTION

The present claimed invention relates to the field of single instruction multiple data (SIMD) vector processes. More particularly, the present claimed invention relates to extended precision in SIMD vector arithmetic operations.

BACKGROUND ART

Today, most processors in computer systems provide a 64-bit datapath architecture. The 64-bit datapath allows operations such as read, write, add, subtract, and multiply on the entire 64 bits of data at a time. This added bandwidth has significantly improved performance of the processors.

However, the data types of many real world applications do not utilize the full 64 bits in data processing. For example, in digital signal processing (DSP) applications involving audio, video, and graphics data processing, the light and sound values are usually represented by data types of 8, 12, 16, or 24 bit numbers. This is because people typically are not able to distinguish the levels of light and sound beyond the levels represented by these numbers of bits. Hence, DSP applications typically require data types far less than the full 64 bits provided in the datapath in most computer systems.

In initial applications, the entire datapath was used to compute an image or sound value. For example, an 8 or 16 bit number representing a pixel or sound value was loaded into a 64-bit number. Then, an arithmetic operation, such as an add or multiply, was performed on the entire 64-bit number. This method proved inefficient, however, as it was soon realized that not all the data bits were being utilized in the process since digital representation of a sound or pixel requires far fewer bits. Thus, in order to utilize the entire datapath, a multitude of smaller numbers were packed into the 64 bit doubleword.

Furthermore, much of data processing in DSP applications involve repetitive and parallel processing of small integer data types using loops. To take advantage of this repetitive and parallel data process, a number of today's processors implement single instruction multiple data (SIMD) in the instruction architecture. For instance, the Intel Pentium MMX™ chips incorporate a set of SIMD instructions to boost multimedia performance.

Prior Art FIG. 1 illustrates an exemplary single instruction multiple data instruction process. Exemplary registers, vs and vt, in a processor are of 64-bit width. Each register is packed with four 16-bit data elements fetched from memory: register vs contains vs[0], vs[1], vs[2], and vs[3] and register vt contains vt[0], vt[1], vt[2], and vt[3]. The registers in essence contain a vector of N elements. To add elements of matching index, an add instruction adds, independently, each of the element pairs of matching index from vs and vt. A third register, vd, of 64-bit width may be used to store the result.

For example, vs[0] is added to vt[0] and its result is stored into vd[0]. Similarly, vd[1], vd[2], and vd[3] store the sum of vs and vd elements of corresponding indexes. Hence, a single add operation on the 64-bit vector results in 4 simultaneous additions on each of the 16-bit elements. On the other hand, if 8-bit elements were packed into the registers, one add operation performs 8 independent additions in parallel. Consequently, when a SIMD arithmetic instruction, such as addition, subtraction, or multiply, is performed on the data in the 64-bit datapath, the operation actually performs multiple numbers of operations independently and in parallel on each of the smaller elements comprising the 64 bit datapath.

Unfortunately, however, an arithmetic operation such as add and multiply on SIMD vectors typically increases the number of significant bits in the result. For instance, an addition of two n-bit numbers may result in a number of n+1 bits. Moreover, a multiplication of two n-bit numbers produces a number of 2n bit width. Hence, the results of an arithmetic operation on a SIMD vector may not be accurate to a desired significant bit.

Furthermore, the nature of multimedia DSP applications often increases inaccuracies in significant bits. For example, many DSP algorithms implemented in DSP applications require a series of computations producing partial results that are larger or bigger, in terms of significant number of bits, than the final result. Since the final result does not fully account for the significant bits of these partial results, the final result may not accurately reflect the ideal result, which takes into account all significant bits of the intermediate results.

To recapture the full significant bits in a SIMD vector arithmetic operation, the size of the data in bits for each individual element was typically boosted or promoted to twice the size of the original data in bits. Thus, for multiplication on 8-bit elements in a SIMD vector for instance, the 8-bit elements were converted (i.e., unpacked) into 16-bit elements containing 8 significant bits to provide enough space to hold the subsequent product.

Unfortunately, however, the boost in the number of data bits largely undermined the benefits of SIMD vector scheme by reducing the speed of an arithmetic operation in half. This is because the boosting of data bits to twice the original size results in half as many data elements in a register. Hence, an operation on the entire 64-bit datapath comprised of 16-bit elements accomplishes only 4 operations in comparison to 8 operations on a 64-bit datapath comprised of 8-bit elements. In short, boosting a data size by X-fold results in performance reduction of (1/X)*100 percent. As a result, instead of an effective 64-bit datapath, the effective datapath was only 32-bits wide.

Thus, what is needed is a method and system for providing extended precision in SIMD vector arithmetic operations without sacrificing speed and performance.

SUMMARY OF THE INVENTION

The present invention provides extended precision in SIMD arithmetic operations in a processor having a register file and an accumulator. The register file is comprised of a plurality of general purpose registers of N bit width. The size of the accumulator is preferably an integer multiple of the size of the general purpose registers. The preferred embodiment uses registers of 64 bits and an accumulator of 192 bits. The present invention first loads, from a memory, a first set of data elements into a first vector register and a second set of data elements into a second vector register. Each data element comprises N bits. Next, an arithmetic instruction is fetched from memory and is decoded. Then, the first vector register and the second vector register are read from the register file as specified in the arithmetic instruction. The present invention then executes the arithmetic instruction on corresponding data elements in the first and second vector registers. The resulting element of the execution is then written into the accumulator. Then, the resulting element is transformed into an N-bit width element and written into a third register for further operation or storage in the memory. In embodiments, the transformation of the resulting element can include rounding, clamping, and/or shifting the element.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail so as not to unnecessarily obscure aspects of the present invention.

The present invention features a method for providing extended precision in single-instruction multiple-data (SIMD) arithmetic operations in a computer system. The preferred embodiment of the present invention performs integer SIMD vector arithmetic operations in a processor having a 64-bit wide datapath within an exemplary computer system described above. Extended precision in the SIMD arithmetic operations are supplied through the use of an accumulator register having a preferred width of 3 times the general purpose register width. Although a datapath of 64-bits is exemplified herein, the present invention is readily adaptable to datapaths of other variations in width.

Computer System Environment

Figure 1:
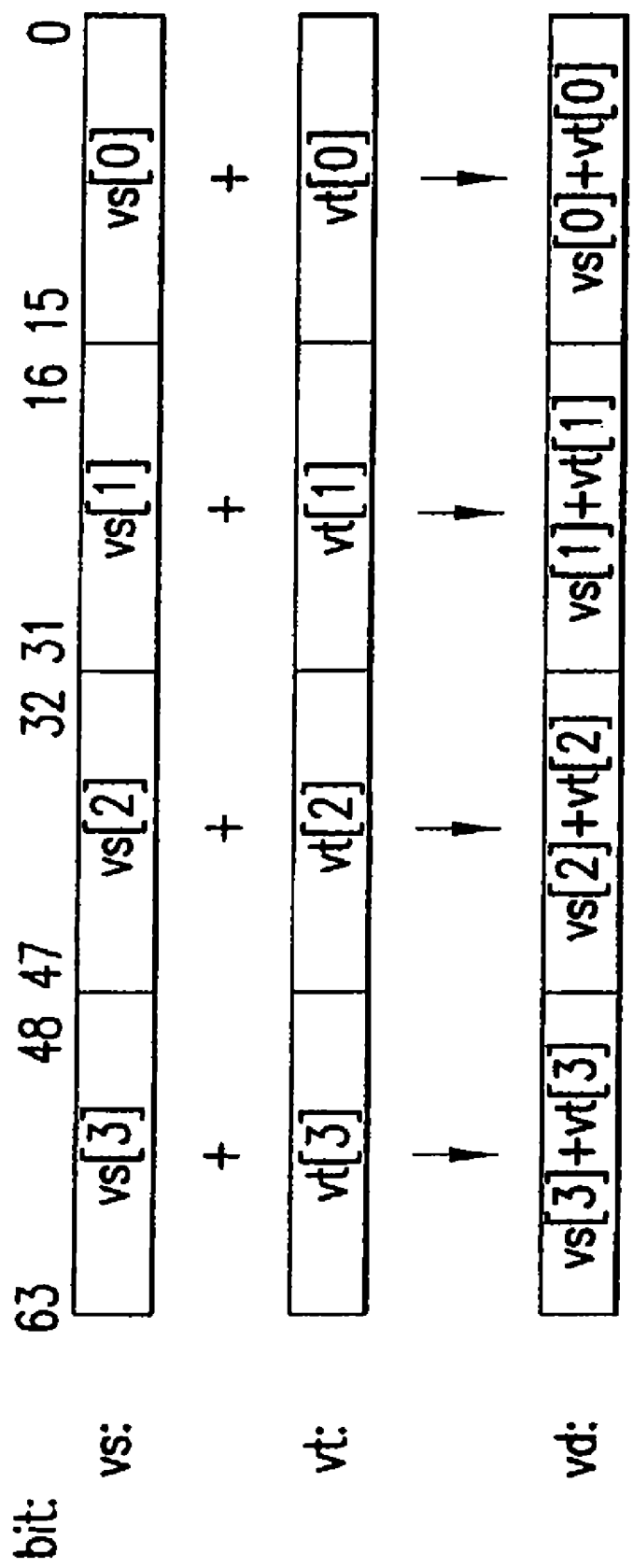
FIG. 1 illustrates an exemplary single instruction multiple data (SIMD) instruction method.
Figure 2:
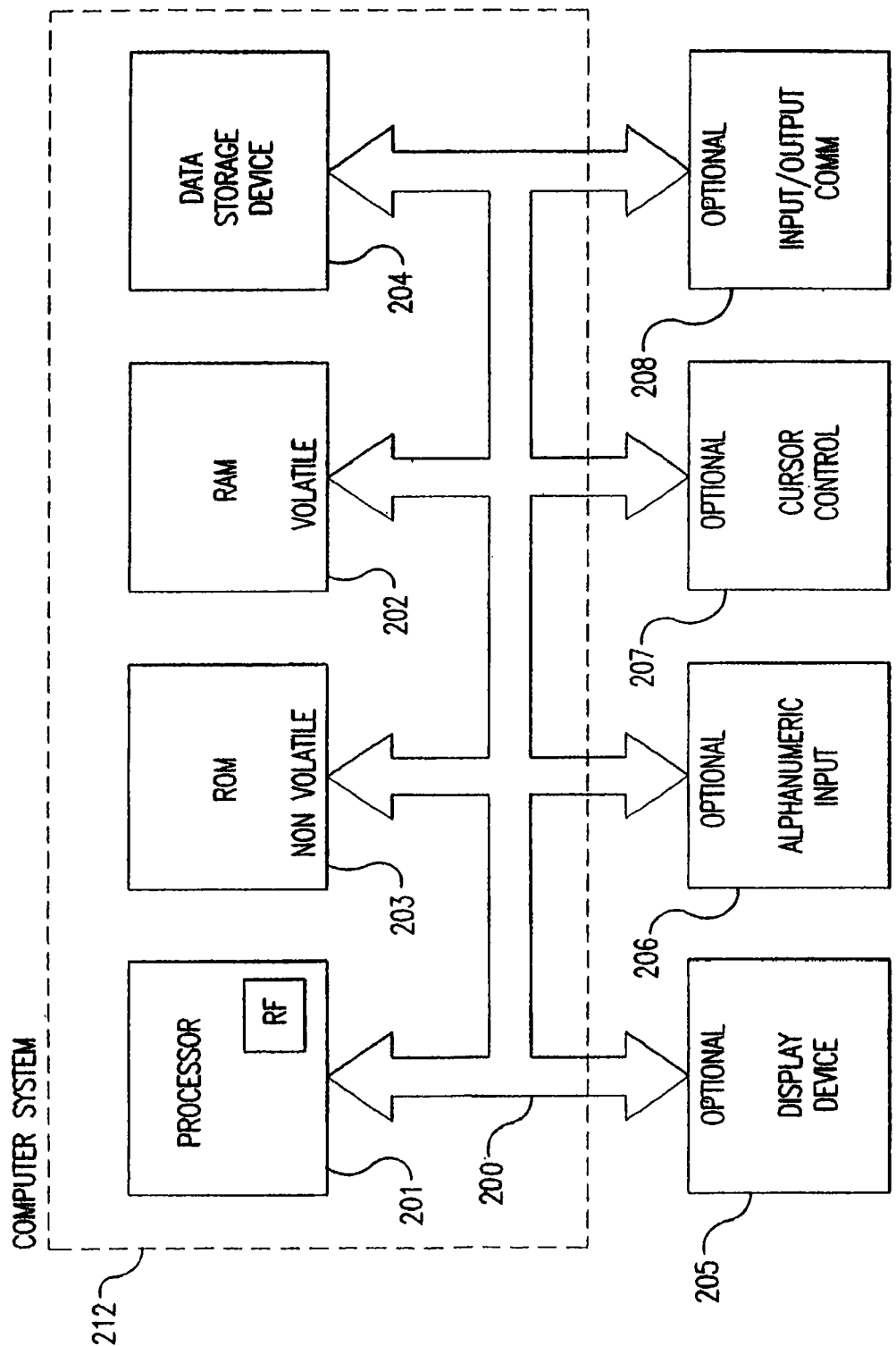
FIG. 2 illustrates an exemplary computer system of the present invention.

FIG. 2 illustrates an exemplary computer system 212 comprised of a system bus 200 for communicating information, one or more central processors 201 coupled with the bus 200 for processing information and instructions, a computer readable volatile memory unit 202 (e.g., random access memory, static RAM, dynamic RAM, etc.) coupled with the bus 200 for storing information and instructions for the central processor(s) 201, a computer readable non-volatile memory unit 203 (e.g., read only memory, programmable ROM, flash memory, EPROM, EEPROM, etc.) coupled with the bus 200 for storing static information and instructions for the processor(s).

Computer system 212 of FIG. 2 also includes a mass storage computer readable data storage device 204 (hard drive, floppy, CD-ROM, optical drive, etc.) such as a magnetic or optical disk and disk drive coupled with the bus 200 for storing information and instructions. Optionally, system 212 can include a display device 205 coupled to the bus 200 for displaying information to the user, an alphanumeric input device 206 including alphanumeric and function keys coupled to the bus 200 for communicating information and command selections to the central processor(s) 201, a cursor control device 207 coupled to the bus for communicating user input information and command selections to the central processor(s) 201, and a signal generating device 208 coupled to the bus 200 for communicating command selections to the processor(s) 201.

According to a preferred embodiment of the present invention, the processor(s) 201 is a SIMD vector unit which can function as a coprocessor for a host processor (not shown). The VU performs arithmetic and logical operations on individual data elements within a data word using the instruction methods described below. Data words are treated as vectors of N×1 elements, where N can be 8, 16, 32, 64, or multiples thereof. For example, a set of N×1 data elements of either 8- or 16-bit fields comprises a data doubleword of 64-bit width. Hence, a 64 bit wide double word contains either 4 16-bit elements or 8 8-bit elements.

Figure 3:
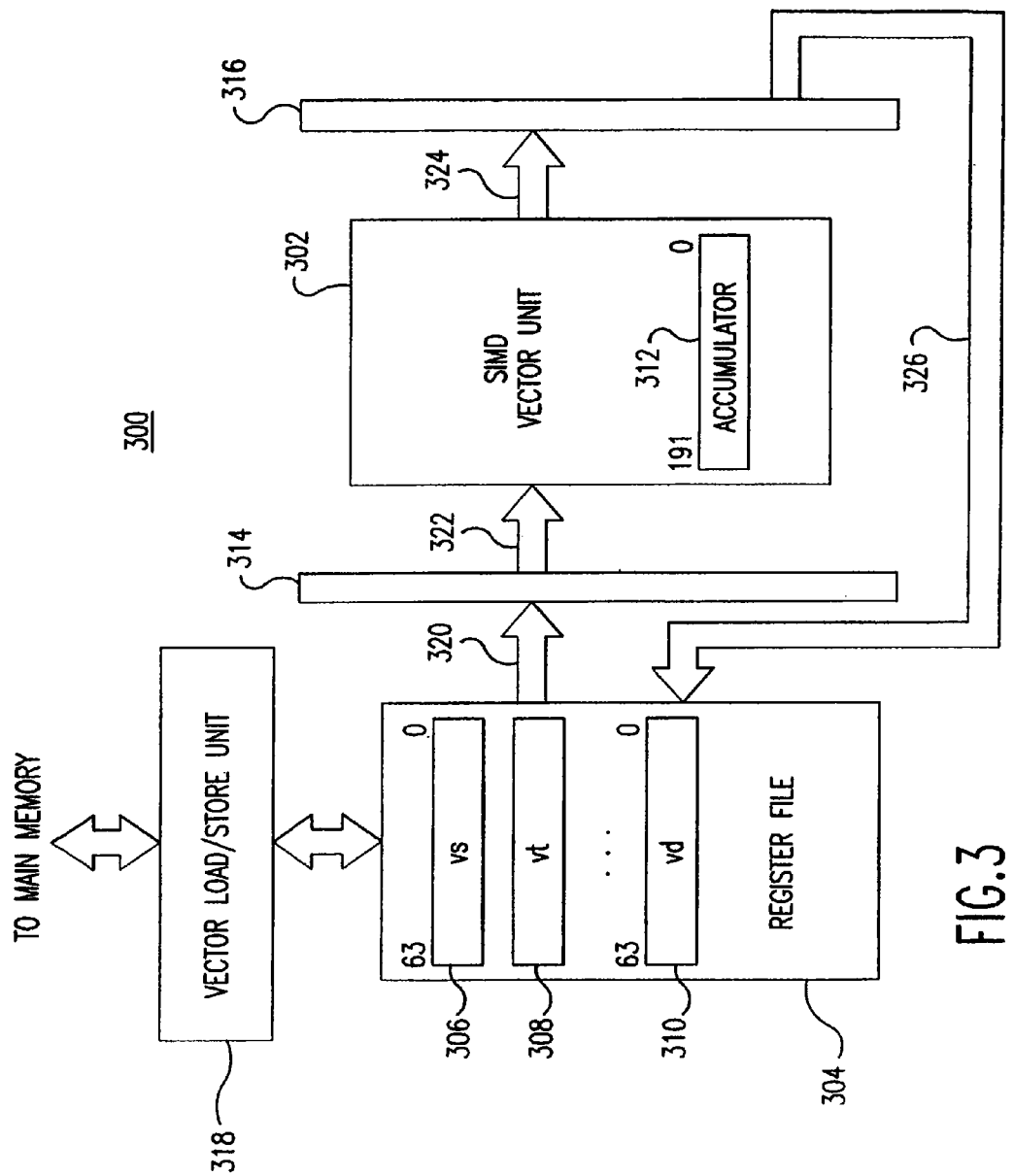
FIG. 3 illustrates a block diagram of an exemplary datapath including a SIMD vector unit (VU), a register file, and a vector load/store unit according to one embodiment of the present invention.

FIG. 3 illustrates a block diagram of an exemplary datapath 300 including a SIMD vector unit (VU) 302, a register file 304, a vector load/store unit 318, and crossbar circuits 314 and 316 according to one embodiment of the present invention. The VU 302 executes an operation specified in the instruction on each element within a vector in parallel. The VU 302 can operate on data that is the full width of the local on-chip memories, up to 64 bits. This allows parallel operations on 8 8-bit, 4 16-bit, 2 32-bit, or 1 64-bit elements in one cycle. The VU 302 includes an accumulator 312 to hold values to be accumulated or accumulated results.

The vector register file is comprised of 32 64-bit general purpose registers 306 through 310. The general purpose registers 306 through 310 are visible to the programmer and can be used to store intermediate results. The preferred embodiment of the present invention uses the floating point registers (FPR) of a floating point unit (FPU) as its vector registers.

In this shared arrangement, data is moved between the vector register file 304 and memory with Floating Point load and store doubleword instructions through the vector load/store unit 318. These load and store operations are unformatted. That is, no format conversions are performed and therefore no floating-point exceptions can occur due to these operations. Similarly, data is moved between the vector register file 304 and the VU 302 without format conversions, and thus no floating-point exception occurs.

Within each register, data may be written, or read, as bytes (8-bits), short-words (16-bits), words (32-bits), or double-words (64-bits). Specifically, the vector registers of the present invention are interpreted in the following new data formats: Quad Half (QH), Oct Byte (OB), Bi Word (BW), and Long (L). In QH format, a vector register is interpreted as having 16-bit elements. For example, a 64-bit vector register is interpreted as a vector of 4 signed 16-bit integers. OB format interprets a vector register as being comprised of 8-bit elements. Hence, an exemplary 64-bit vector register is seen as a vector of 8 unsigned 8-bit integers. In BW format, a vector register is interpreted as having 32-bit elements. L format interprets a vector register as having 64-bit elements. These data types are provided to be adaptable to various register sizes of a processor. As described above, data format conversion is not necessary between these formats and floating-point format.

With reference to FIG. 3, the present invention utilizes crossbar circuits to select and route elements of a vector operand. For example, the crossbar circuit 314 allows selection of elements of a given data type and pass on the selected elements as operands to VU 302. The VU 302 performs arithmetic operations on operands comprised of elements and outputs the result to another crossbar circuit 316. This crossbar circuit 316 routes the resulting elements to corresponding element fields in registers such as vd 310 and accumulator 312. Those skilled in the art will no doubt recognize that crossbar circuits are routinely used to select and route the elements of a vector operand.

With reference to FIG. 3, the present invention also provides a special register, accumulator 312, of preferably 192-bit width. This register is used to store intermediate add, subtract, or multiply results generated by one instruction with the intermediate add, subtract, or multiply results generated by either previous or subsequent instructions. The accumulator 312 can also be loaded with a vector of elements from memory through a register. In addition, the accumulator 312 is capable of forwarding data to the VU 302, which executes arithmetic instructions. Although the accumulator 312 is shown to be included in the VU 302, those skilled in the art will recognize that it can also be placed in other parts of the datapath so as to hold either accumulated results or values to be accumulated.

Figure 4:
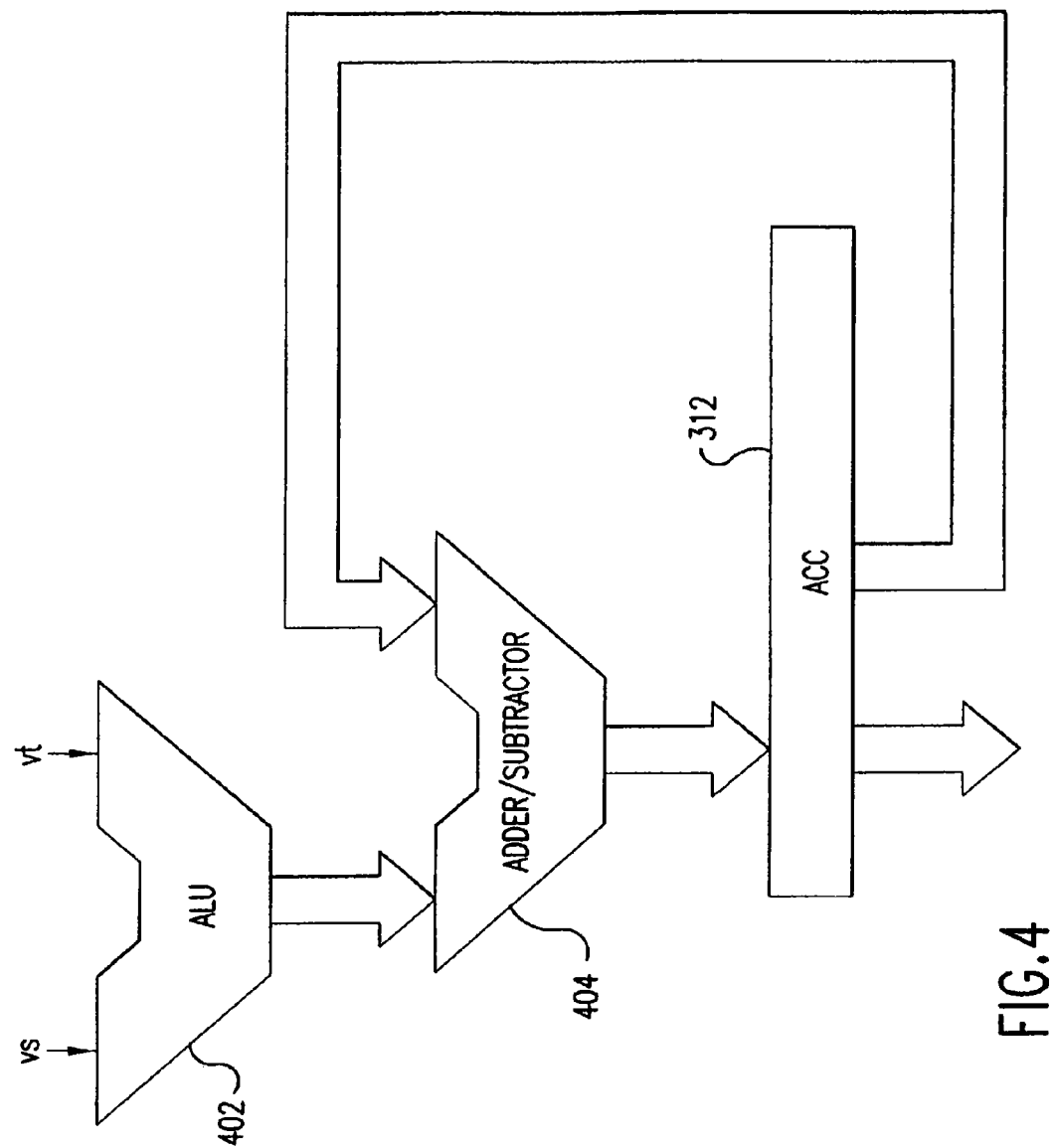
FIG. 4 illustrates a more detailed datapath architecture including the accumulator in accordance with the present invention.

FIG. 4 illustrates a more detailed datapath architecture including the accumulator 312. In this datapath, the contents of two registers, vs and vt, are operated on by an ALU 402 to produce a result. The result from the ALU can be supplied as an operand to another ALU such as an adder/subtractor 404. In this datapath configuration, the accumulator 312 can forward its content to be used as the other operand to the adder/subtractor 404. In this manner, the accumulator 312 can be used as both a source and a destination in consecutive cycles without causing pipe stalls or data hazards. By thus accumulating the intermediate results in its expanded form in tandem with its ability to be used as both a source and a destination, the accumulator 312 is used to provide extended precision for SIMD arithmetic operations.

An exemplary accumulator of the present invention is larger in size than general purpose registers. The preferred embodiment uses a 192-bit accumulator and 64-bit registers. The format of the accumulator is determined by the format of the elements accumulated. That is, the data types of an accumulator matches the data type of operands specified in an instruction. For example, if the operand register is in QH format, the accumulator is interpreted to contain 4 48-bit elements. In OB format, the accumulator is seen as having 8 24-bit elements. In addition, accumulator elements are always signed. Elements are stored from or loaded into the accumulator indirectly to and from the main memory by staging the elements through the shared Floating Point register file.

Figure 5:
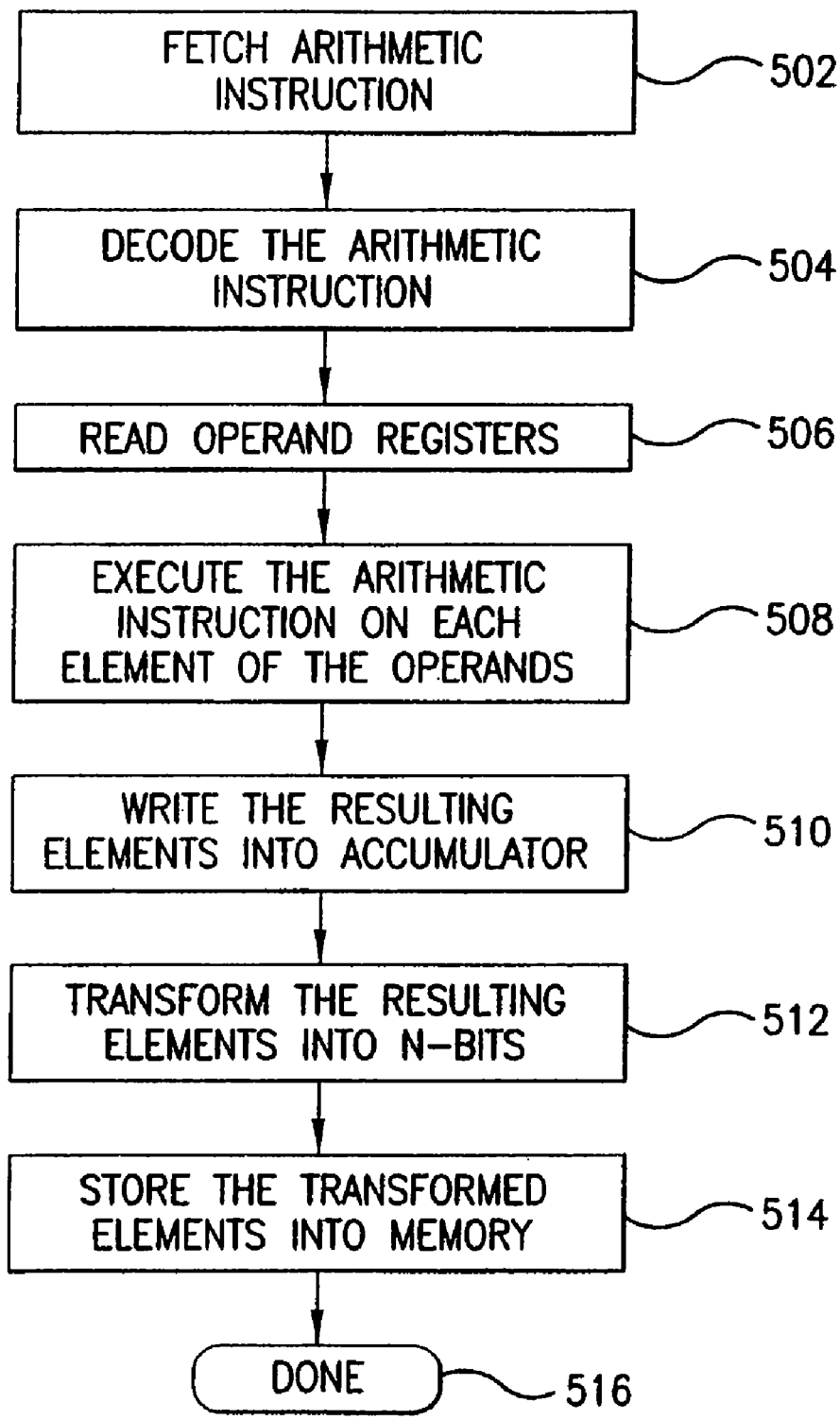
FIG. 5 illustrates a flow diagram of general operation of an exemplary arithmetic instruction according to a preferred embodiment of the present invention.

FIG. 5 illustrates a flow diagram of an exemplary arithmetic operation according to a preferred embodiment of the invention. In step 502, an arithmetic instruction is fetched from memory into an instruction register.

Then in step 504, the instruction is decoded to determine the specific arithmetic operation, operand registers, selection of elements in operand registers, and data types. The instruction opcode specifies an arithmetic operation such as add, multiply, or subtract in its opcode field. The instruction also specifies the data type of elements, which determines the width in bits and number of elements involved in the arithmetic operation. For example, OB data type format instructs the processor to interpret a vector register as containing 8 8-bit elements. On the other hand, QH format directs the processor to interpret the vector register as having 4 16-bit elements.

The instruction further specifies two operand registers, a first register (vs) and a second register (vt). The instruction selects the elements of the second register, vt, to be used with each element of the accumulator, and/or the first register, vs. For example, the present invention allows selection of one element from the second register to be used in an arithmetic operation with all the elements in the first register independently and in parallel. The selected element is replicated for every element in the first register. In the alternative, the present invention provides selection of all elements from the second register to be used in the arithmetic operation with all the elements in the first register. The arithmetic operation operates on the corresponding elements of the registers independently and in parallel. The present invention also provides an immediate value (i.e., a constant) in a vector field in the instruction. The immediate value is replicated for every element of the second register before an arithmetic operation is performed between the first and second registers.

According to the decoded instruction, the first register and the second register with the selected elements are read for execution of the arithmetic operation in step 506. Then in step 508, the arithmetic operation encoded in the instruction is executed using each pair of the corresponding elements of the first register and the second register as operands. The resulting elements of the execution are written into corresponding elements in the accumulator in step 510. According to another embodiment of the present invention, the resulting elements of the execution are added to the existing values in the accumulator elements. That is, the accumulator "accumulates" (i.e., adds) the resulting elements onto its existing elements. The elements in the accumulator are then transformed into N-bit width in step 512. Finally, in step 514, the transformed elements are stored into memory. The process then terminates in step 516.

The SIMD vector instructions according to the present invention either write all 192 bits of the accumulator or all 64 bits of an FPR, or the condition codes. Results are not stored to multiple destinations, including the condition codes.

Integer vector operations that write to the FPRs clamp the values being written to the target's representable range. That is, the elements are saturated for overflows and underflows. For overflows, the values are clamped to the largest representable value. For underflows, the values are clamped to the smallest representable value.

On the other hand, integer vector operations that write to an accumulator do not clamp their values before writing, but allow underflows and overflows to wrap around the accumulator's representable range. Hence, the significant bits that otherwise would be lost are stored into the extra bits provided in the accumulator. These extra bits in the accumulator thus ensure that unwanted overflows and underflows do not occur when writing to the accumulator or FPRs.

Selection of Vector Elements

The preferred embodiment of the present invention utilizes an accumulator register and a set of vector registers in performing precision arithmetic operations. First, an exemplary vector register, vs, is used to hold a set of vector elements. A second exemplary vector register, vt, holds a selected set of vector elements for performing operations in conjunction with the elements in vector register, vs. The present invention allows an arithmetic instruction to select elements in vector register vt for operation with corresponding elements in other vector registers through the use of a well known crossbar method. A third exemplary vector register, vd, may be used to hold the results of operations on the elements of the registers described above. Although these registers (vs, vt, and vd) are used to associate vector registers with a set of vector elements, other vector registers are equally suitable for the present invention.

To perform arithmetic operations on desired elements of a vector, the present invention uses a well known crossbar method adapted to select an element of the vector register, vt, and replicate the element in all other element fields of the vector. That is, an element of vt is propagated to all other elements in the vector to be used with each of the elements of the other vector operand. Alternatively, all the elements of the vector, vt, may be selected without modification. Another selection method allows an instruction to specify as an element an immediate value in the instruction opcode vector field corresponding to vt and replicate the element for all other elements of vector vt. These elements thus selected are then passed onto the VU for arithmetic operation.

Figure 6:
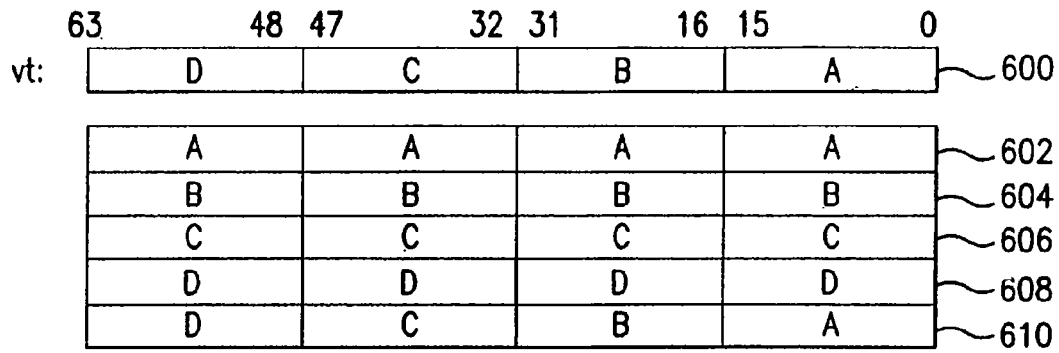
FIG. 6 illustrates an element select format for 4 16-bit elements in a 64-bit register.

FIG. 6 illustrates an element select format for 4 16-bit elements in a 64-bit register. The exemplary vector register vt 600 is initially loaded with four elements: A, B, C, and D. The present invention allows an instruction to select or specify any one of the element formats as indicated by rows 602 through 610. For example, element B for vt 600 may be selected and replicated for all 4 elements as shown in row 604. On the other hand the vt 600 may be passed without any modification as in row 610.

Figure 7:
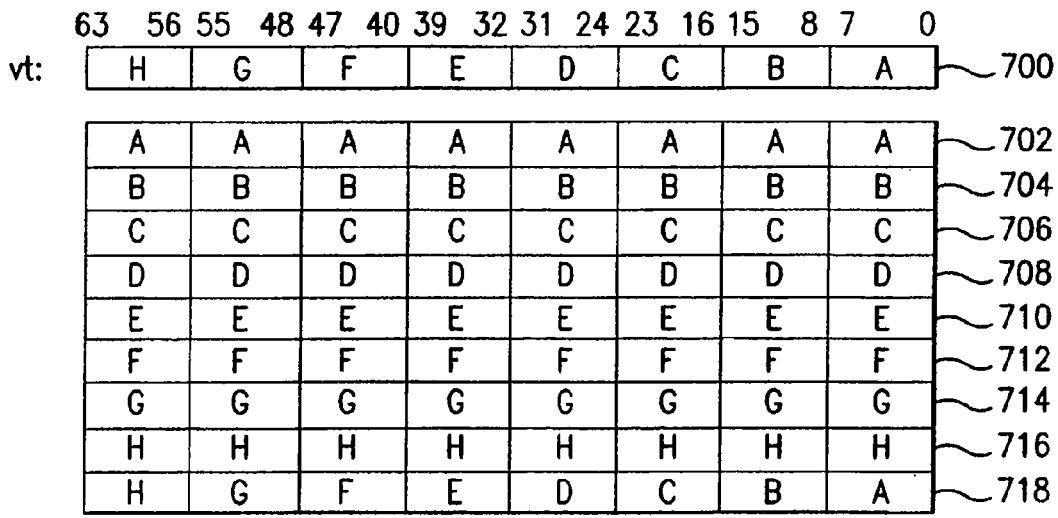
FIG. 7 illustrates an element select format for 8 8-bit elements in a 64-bit register.

FIG. 7 illustrates an element select format for 8 8-bit elements in a 64-bit register. The exemplary vector register vt 700 is initially loaded with eight elements: A, B, C, D, E, F, G, and H. The present invention allows an instruction to select or specify any one of the element formats as indicated by rows 702 through 718. For example, element G for vt 700 may be selected and replicated for all 8 elements as shown in row 714. On the other hand, the vt 700 may be passed without any modification as in row 718.

Arithmetic Instructions

In accordance with the preferred embodiment of the present invention, arithmetic operations are performed on the corresponding elements of vector registers. The instruction is fetched from main memory and is loaded into an instruction register. It specifies the arithmetic operation to be performed.

In the following arithmetic instructions, the operands are values in integer vector format. The accumulator is in the corresponding accumulator vector format. The arithmetic operations are performed between elements of vectors occupying corresponding positions in the vector field in accordance with SIMD characteristics of the present invention. For example, an add operation between vs and vt actually describes eight parallel add operations between vs[0] and vt[0] to vs[7] and vt[7]. After an arithmetic operation has been performed but before the values are written into the accumulator, a wrapped arithmetic is performed such that overflows and underflows wrap around the accumulator's representable range.

Accumulate Vector Add (ADDA.fmt). In the present invention ADDA.fmt instruction, the elements in vector registers vt and vs are added to those in the accumulator. Specifically, the corresponding elements in vector registers vt and vs are added. Then, the elements of the sum are added to the corresponding elements in the accumulator. Any overflows or underflows in the elements wrap around the accumulator's representable range and then are written into the accumulator.

Figure 8:
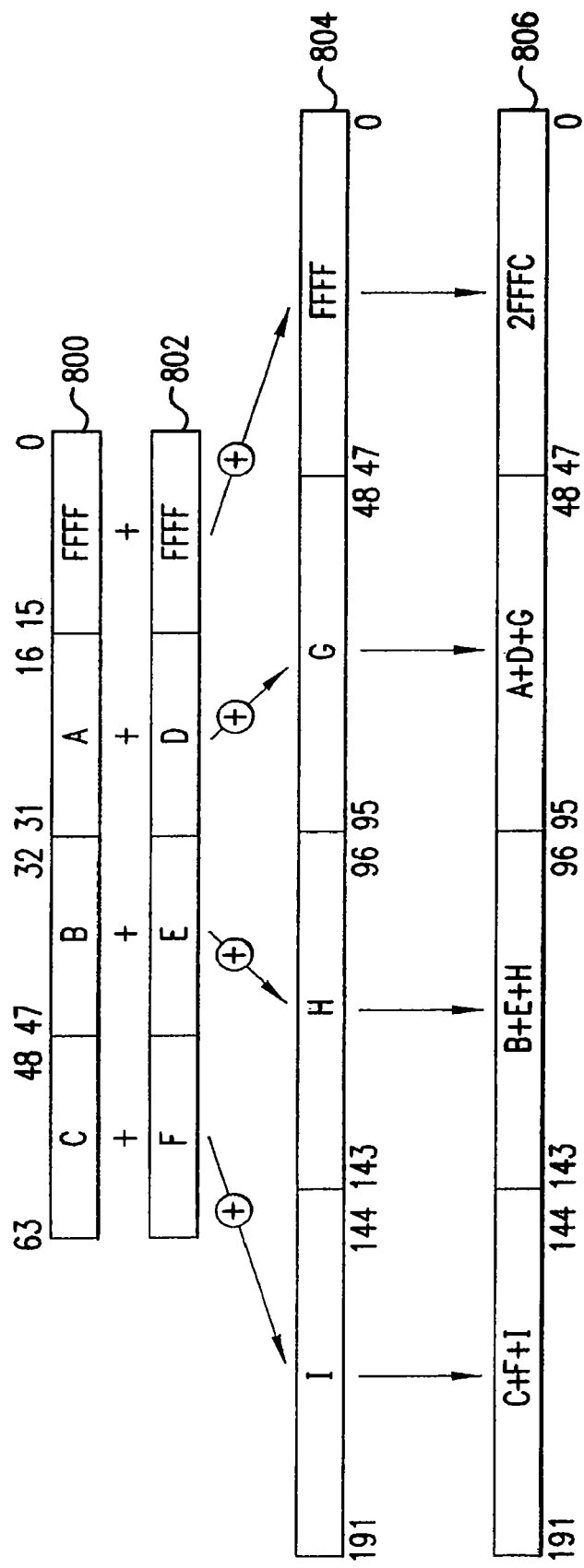
FIG. 8 illustrates an exemplary ADDA.fmt arithmetic operation between elements of exemplary operand registers vs and vt.

FIG. 8 illustrates an exemplary ADDA.fmt arithmetic operation between elements of operand registers vs 800 and vt 802. Each of the registers 800, 802, and 804 contains 4 16-bit elements. Each letter in the elements (i.e., A, B, C, D, E, F, G, H, and I) stands for a binary number. FFFF is a hexadecimal representation of 16-bit binary number, 1111 1111 1111 1111. The vs register 800 holds elements FFFF, A, B, and C. The selected elements of vt registers are FFFF, D, E, and F. The ADDA.fmt arithmetic instruction directs the VU to add corresponding elements: FFFF+FFFF (=1FFFD), A+D, B+E, and C+F. Each of these sums are then added to the corresponding existing elements (i.e., FFFF, G, H, and I) in the accumulator 804: FFFF+1FFFD, A+D+G, B+E+H, and C+F+I. The addition of the hexadecimal numbers, 1FFFD and FFFF, produces 2FFFC, an overflow condition for a general purpose 64-bit register. The accumulator's representable range is 48 bits in accordance with the present invention. Since this is more than enough bits to represent the number, the entire number 2FFFC is written into the accumulator. As a result, no bits have been lost in the addition and accumulation process.

Load Vector Add (ADDL.fmt). According to the ADDL.fmt instruction, the corresponding elements in vectors vt and vs are added and then stored into corresponding elements in the accumulator. Any overflows or underflows in the elements wrap around the accumulator's representable range and then are written into the accumulator 806.

Figure 9:
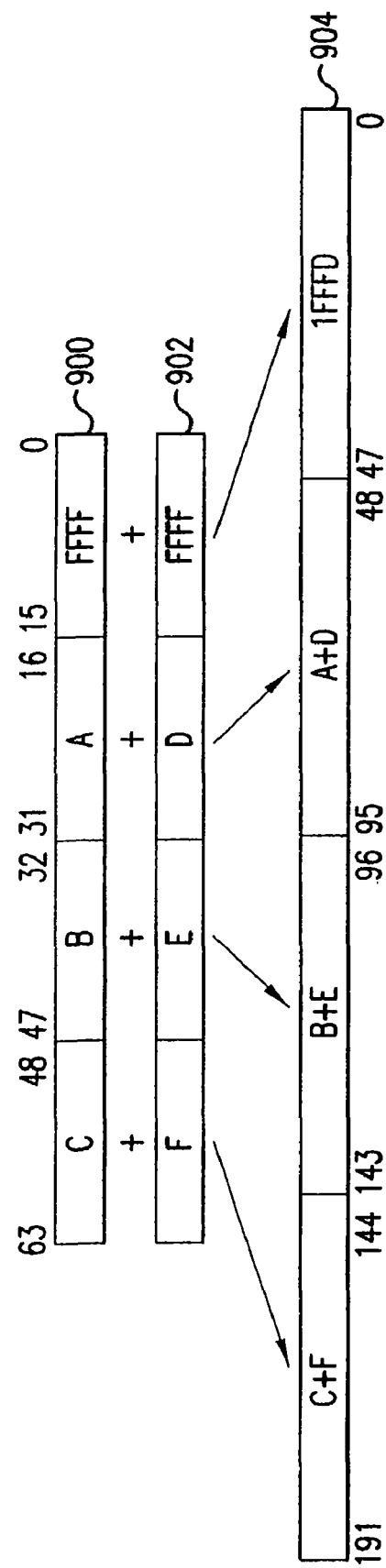
FIG. 9 illustrates an exemplary ADDL.fmt arithmetic operation between elements of exemplary operand registers vs and vt.

FIG. 9 illustrates an exemplary ADDL.fmt arithmetic operation between elements of operand registers vs 900 and vt 902. Each of the registers 900, 902, and 904 contains 4 16-bit elements. Each letter in the elements (i.e., A, B, C, D, E, and F) stands for a binary number. FFFF is a hexadecimal representation of 16-bit binary number, 1111 1111 1111 1111. The vs register 900 holds elements FFFF, A, B, and C. The selected elements of vt registers are FFFF, D, E, and F. The ADDA.fmt arithmetic instruction instructs the VU to add corresponding elements: FFFF+FFFF, A+D, B+E, and C+F. The addition of hexadecimal numbers, FFFF and FFFF, produces 1FFFD, a technical overflow condition for a general purpose 64-bit register. The present invention wraps the number 1FFFD around the accumulator's representable range, which is 48 bits. Since this is more than enough bits to represent the number, the entire number 1FFFD is written into the accumulator. As a result, no bits have been lost in the addition process.

Accumulate Vector Multiply (MULA.fmt). The MULA.fmt instruction multiplies the values in vectors vt and vs. Then the product is added to the accumulator. Any overflows or underflows in the elements wrap around the accumulator's representable range and then are written into the accumulator.

Add Vector Multiply to Accumulator (MULL.fmt). The MULL.fmt instruction multiplies the values in vectors vt and vs. Then, the product is written to the accumulator. Any overflows or underflows in the elements wrap around the accumulator's representable range and then are written into the accumulator.

Subtract Vector Multiply from Accumulator (MULS.fmt). In MULS.fmt instruction, the values in vector vt are multiplied by the values in vector vs, and the product is subtracted from the accumulator. Any overflows or underflows in the elements wrap around the accumulator's representable range and then are written into the accumulator.

Load Negative Vector Multiply (MULSL.fmt). The MULSL.fmt instruction multiplies the values in vector vt with the values in vector vs. Then, the product is subtracted from the accumulator. Any overflows or underflows in the elements wrap around the accumulator's representable range and then are written into the accumulator.

Accumulate Vector Difference (SUBA.fmt). The present SUBA.fmt instruction computes the difference between vectors vt and vs. Then, it adds the difference to the value in the accumulator. Any overflows or underflows in the elements wrap around the accumulator's representable range and then are written into the accumulator.

Load Vector Difference (SUBL.fmt). According to SUBL.fmt instruction, the differences of vectors vt and vs are written into those in the accumulator. Any overflows or underflows in the elements wrap around the accumulator's representable range and then are written into the accumulator.

Element Transformation

After an arithmetic operation, the elements in the accumulator are transformed into the precision of the elements in the destination registers for further processing or for eventual storage into a memory unit. During the transformation process, the data in each accumulator element is packed to the precision of the destination operand. The present invention provides the following instruction method for such transformation.

Scale, Round and Clamp Accumulator (Rx.fmt). According to Rx.fmt instruction, the values in the accumulator are shifted right by the values specified in a vector field vt in the instruction opcode. This variable shift supports application or algorithm specific fixed point precision. The vt operands are values in integer vector format. The accumulator is in the corresponding accumulator vector format.

Then, each element in the accumulator is rounded according to a mode specified by the instruction. The preferred embodiment of the invention allows three rounding modes: 1) round toward zero, 2) round to nearest with exactly halfway rounding away from zero, and 3) round to nearest with exactly halfway rounding to even. These rounding modes minimize truncation errors during the arithmetic process.

The elements are then clamped to either a signed or unsigned range of an exemplary destination vector register, vd. That is, the elements are saturated to the largest representable value for overflow and the smallest representable value for underflow. Hence, the clamping limits the resultant values to the minimum and maximum precision of the destination elements without overflow or underflow.

Saving Accumulator State

Since the vector accumulator is a special register, the present invention allows the contents of the accumulator to be saved in a general register. However, because the size of the elements of the accumulator is larger than the elements of general purpose registers, the transfer occurs in multiple chunks of constituent elements. The following instructions allow storage of the accumulator state.

Read Accumulator (RAC.fmt). The RAC.fmt instruction reads a portion of the accumulator elements, preferably a third of the bits in elements, and saves the elements into a vector register. Specifically, this instruction method allows the least significant, middle significant, or most significant third of the bits of the accumulator elements to be assigned to a vector register such as vd. In this operation, the values extracted are not clamped. That is, the bits are simply copied into the elements of vector register, vd.

Write Accumulator High (WACH.fmt). The WACH.fmt instruction loads portions of the accumulator from a vector register. Specifically, this instruction method writes the most significant third of the bits of the accumulator elements from a vector register such as vs. The least significant two thirds of the bits of the accumulator are not affected by this operation.

Write Accumulator Low (WACL.fmt). According to WACL.fmt instruction, the present invention loads two thirds of the accumulator from two vector registers. Specifically, this instruction method writes the least significant two thirds of the bits of the accumulator elements. The remaining upper one third of the bits of the accumulator elements are written by the sign bits of the corresponding elements of a vector register such as vs, replicated by 16 or 8 times, depending on the data type format specified in the instruction.

A RACL/RACM/RACH instruction followed by WACL/WACH are used to save and restore the accumulator. This save/restore function is format independent, either format can be used to save or restore accumulator values generated by either QH or OB operations. Data conversion need not occur. The mapping between element bits of the OB format accumulator and bits of the same accumulator interpreted in QH format is implementation specific, but consistent for each implementation.

The present invention, a method for providing extended precision in SIMD vector arithmetic operations, utilizes an accumulator register. While the present invention has been described in particular embodiments, it should be appreciated that the present invention should not be construed as being limited by such embodiments, but rather construed according to the claims below.

What is claimed is:

1. A computer-based method for providing extended precision in single instruction multiple data (SIMD) arithmetic operations, comprising:
   performing, at a first execution unit, a first arithmetic operation on a first set of N-bit operands;
   performing, at a second execution unit, a second arithmetic operation on a result of the first arithmetic operation;
   setting a length M equal to a value corresponding to a length of the significant bits of a result of the second arithmetic operation:
   conveying, via a data path, the result of the second arithmetic operation to a first M-bit resulting element of an accumulator, wherein M is greater than N;
   performing, at the first execution unit, a third arithmetic operation on a second set of N-bit operands; and
   performing, at the second execution unit, a fourth arithmetic operation based on the result of the third arithmetic operation and a value from the accumulator.

2. The method of claim 1, wherein the conveying is via a routing device.

3. The method of claim 1, further comprising:
   conveying, via the data path, the result of the second arithmetic operation to a register file.

4. The method of claim 1, further comprising:
   conveying, via the data path, the result of the second arithmetic operation to a load/store unit.

5. The method of claim 1, further comprising:

conveying, via the data path, a result of the fourth arithmetic operation to a second M-bit resulting element of the accumulator.

6. The method of claim 1, further comprising:

transforming the first M-bit resulting element into a width of N-bits; and writing the resulting element into a register; wherein a plurality of M-bit resulting elements in the accumulator are wrapped around the representable range of the resulting elements.

7. The method of claim 6, wherein transforming the first M-bit resulting element comprises clamping the resulting element.

8. The method of claim 7, wherein transforming the first M-bit resulting element further comprises rounding the resulting element.

9. A computer system, comprising:

an accumulator;

a first execution unit configured to receive N-bit operands and to perform a first arithmetic operation;

a second execution unit configured to:

receive a result of the first arithmetic operation, receive a value from the accumulator, perform a second arithmetic operation based on at least one of, the result of the first arithmetic operation and the value from the accumulator, and set a length M equal to a value corresponding to a length of the significant bits of a result of the second arithmetic operation; and a data path configured to convey the result of the second arithmetic operation to a first M-bit resulting element of the accumulator, wherein M is greater than N.

10. The computer system of claim 9, wherein at least one of the first and second execution units comprises an arithmetic logic unit (ALU).

11. The computer system of claim 9, further comprising:

a routing device configured to convey the result of the second arithmetic operation to the accumulator along the data path.

12. The computer system of claim 9, further comprising:

a register file configured to receive one or more of the result of the second arithmetic operation and a result from the accumulator.

13. The computer system of claim 9, further comprising:

a load/store unit configured to receive one or more of the result of the second arithmetic operation and a result from the accumulator.

14. The computer system of claim 9, wherein the accumulator is further configured to transform the M-bit resulting element into a width of N-bits, wherein a plurality of M-bit resulting elements in the accumulator are wrapped around the representable range of the resulting elements.

15. A computer-readable medium having computer-executable instructions stored thereon that, when executed by a computing device, cause the computing device to perform a method for providing extended precision in single instruction multiple data (SIMD) arithmetic operations, comprising:

performing, at a first execution unit, a first arithmetic operation on a first set of N-bit operands;

performing, at a second execution unit, a second arithmetic operation on a result of the first arithmetic operation;

setting a length M equal to a value corresponding to a length of the significant bits of a result of the second arithmetic operation;

conveying, via a data path, the result of the second arithmetic operation to a first M-bit resulting element of an accumulator, wherein M is greater than N;

performing, at the first execution unit, a third arithmetic operation on a second set of N-bit operands; and performing, at the second execution unit, a fourth arithmetic operation based on the result of the third arithmetic operation and a value from the accumulator.

16. The computer-readable medium of claim 15, wherein the method further comprises conveying, via the data path, the result of the second arithmetic operation to a load/store unit.

17. The computer-readable medium of claim 15, wherein the method further comprises conveying, via the data path, a result of the fourth arithmetic operation to a second M-bit resulting element of the accumulator.

18. The computer-readable medium of claim 15, wherein the method further comprises:

transforming the first M-bit resulting element into a width of N-bits; and writing the resulting element into a register; wherein a plurality of M-bit resulting elements in the accumulator are wrapped around the representable range of the resulting elements.

19. The computer-readable medium of claim 18, wherein the transforming comprises transforming the first M-bit resulting element into a width of N-bits, wherein transforming the first M-bit resulting element comprises clamping the resulting element.

20. The computer-readable medium of claim 19, wherein the transforming further comprises transforming the first M-bit resulting element further comprises rounding the resulting element.

* * * * *